US008799426B2

(12) United States Patent
Ding et al.

(10) Patent No.: US 8,799,426 B2
(45) Date of Patent: Aug. 5, 2014

(54) HYBRID MODEL IN SELF-PROVISIONING PROCESS

(75) Inventors: Jihui Ding, Bridgewater, NJ (US); Christopher John Lafayette, Bridgewater, NJ (US); Frank Joseph Tommasi, Howell, NJ (US); Prashanthi Roy, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 211 days.

(21) Appl. No.: 13/542,263

(22) Filed: Jul. 5, 2012

(65) Prior Publication Data

US 2014/0012965 A1   Jan. 9, 2014

(51) Int. Cl.
  *G06F 15/173* (2006.01)
  *G06F 15/177* (2006.01)
(52) U.S. Cl.
  USPC .......................................... 709/221; 709/224
(58) Field of Classification Search
  USPC ......... 709/203, 217, 219, 220, 221, 224, 227; 715/736
  See application file for complete search history.

(56) References Cited

U.S. PATENT DOCUMENTS

| 8,504,809 | B2 * | 8/2013 | Chien | 709/227 |
| 2011/0296154 | A1 * | 12/2011 | Chien | 709/220 |
| 2012/0069131 | A1 * | 3/2012 | Abelow | 709/217 |
| 2012/0221955 | A1 * | 8/2012 | Raleigh et al. | 715/736 |

* cited by examiner

*Primary Examiner* — Quang N Nguyen

(57) ABSTRACT

A networked computing device may be configured to determine, by a service application executing on the networked computing device, to change a configuration of a network service plan associated with the networked computing device and used by the service application, the network service plan identifying whether at least one service of the communications network is available for use by the networked computing device, request self-provisioning content from a self-provisioning gateway responsive to the determination, provide, by the service application, a user interface for configuration of the network service plan based on the received self-provisioning content, send a change data feature request to the self-provisioning gateway responsive to a request for the change in the configuration of the network service plan through the provided user interface, and allow for utilization of the service application after receiving a response to the change data feature request without having to restart the service application.

18 Claims, 6 Drawing Sheets

HYBRID MODEL IN SELF-PROVISIONING PROCESS

BACKGROUND

A user of an electronic device may be required to sign up for a service before being granted access to the service. For example, to log into a website, a user may be required to fill out a registration form to create an account, and then use the account to log in. As another example, to view a premium cable channel, a user may be required to contact his or her service provider to make a change to his or her cable plan. Such procedures may be frustrating and may provide for a poor user experience.

DETAILED DESCRIPTION

In some cases, a user of a networked computing device may not be subscribed to a service required for operation of a service application of the networked computing device. For example, the user's network service plan may not cover services such as streaming media, voicemail or navigation. A Self-Provisioning Gateway (SPG) is a device on the network that allows a user to enable and disable subscription services by way of the user's networked computing device. By using an application on the networked computing device, a user may utilize the SPG to sign up for additional network services.

However, many implementations of provisioning systems using SPGs provide a poor user experience. In some examples, users are forced to exit the application for which they desire service, use a web application to perform the provisioning process, and then reinitialize the original application. In other examples, users may receive out-of-date provisioning information such as incorrect pricing or service descriptions.

An improved SPG provisioning model may be utilized to provide a better user experience and improve response time during the self-provisioning process. When subscribing from a service application on the networked computing device, the user may be able to complete the provisioning flow directly from the service application, without having to resort to external web pages. This accordingly allows vendors of service applications to provide user interfaces consistent with the rest of the vendor's application. Moreover, once the user completes the provisioning process, the user may immediately access the service application without having to reopen it. Yet further, the improved SPG provisioning model may provide system administrators the ability to easily update information presented during the provisioning process.

Figure 1:
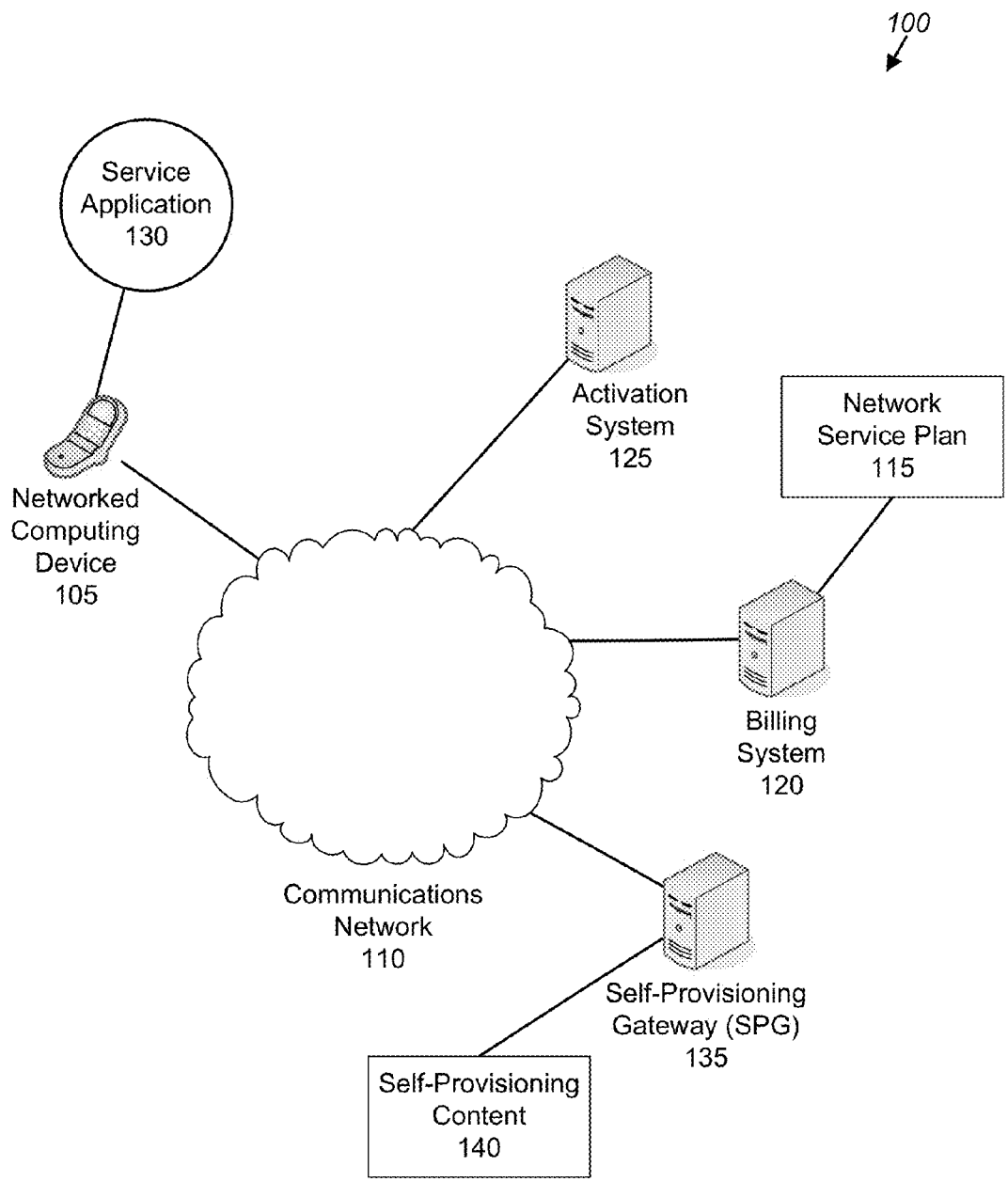
FIG. 1 illustrates an exemplary communications system including a networked computing device configured to utilize a self-provisioning gateway.

FIG. 1 illustrates an exemplary communications system 100 including a networked computing device 105 in communication over a communications network 110. The networked computing device 105 may be implemented as a combination of hardware and software, and may include one or more software applications or processes for causing one or more computer processors to perform the operations of the networked computing device 105 described herein. The networked computing device 105 may be configured to utilize a self-provisioning gateway (SPG) 135, in combination with a billing system 120 and an activation system 125, to provision service required for a service application 130 being executed by the networked computing device 105.

The communications network 110 may provide communications services, such as packet-switched network services (e.g., Internet access and/or VoIP communication services), and circuit-switched services (e.g., plain old telephone service (POTS) and/or integrated services digital network (ISDN) services) to devices such as the networked computing device 105. Correspondingly, the networked computing device 105 on the communications network 110 may have its own unique identifier which may be used to indicate, reference, or selectively connect to other networked computing devices 105 on the communications network 110. Exemplary unique device identifiers may include mobile device numbers (MDNs), Uniform Resource Identifiers (URIs), Internet Protocol (IP) addresses, media access control (MAC) addresses, subscriber identification module (SIM) identifiers, international mobile equipment identity (IMEI) identifiers, and international mobile subscriber identity (IMSI) identifiers, among others.

A network service plan 115 may identify the services and/or other features of the communications network 110 that may be available for use by the networked computing device 105. This identification may be based on one or more unique identifiers associated with the networked computing device 105. As some examples of network service features, the network service plan 115 may identify whether a networked computing device 105 may have access to streaming media services, voicemail services and/or navigation services available via the communications network 110. The network service plan 115 may include additional information, such as pricing and offer information for use of the network services by the networked computing device 105.

The billing system 120 may be configured to house user information relating to the users of the networked computing devices 105. For example, the billing system 120 may be configured to store the network service plan 115 associated with the network computing device 105. Additionally, the billing system 120 may further be configured to make changes to a user's service profile, such as changes to the network service plan 115 associated with a networked computing device 105. The billing system 120 may also further be configured to receive requests to make such changes to the configuration of a network service plan 115 associated with the networked computing device 105, and may respond to these requests by making appropriate updates to the user's network service plan 115.

The activation system 125 may be configured to provision the user's network service plan 115 over the various switches, platforms, and sub-networks of the communications network 110. Accordingly, the activation system 125 may work with the billing system 120 to provision changes in network service plans 115 associated with networked computing devices 105. Exemplary activation systems 125 may include mobile telephone activation systems 125 and cable television activation systems 125, among others.

The networked computing device 105 may include a service application 130 configured to provide access to one or more services available to the networked computing device 105 over the communications network 110. In some cases, the service application 130 may require the configuration of the network service plan 115 associated with the networked computing device 105 to allow for the use of certain services. For instance, use of a navigation service application 130 may require the network service plan 115 to allow for the use of navigation services. Or, use of a video streaming service application 130 may require the network service plan 115 to allow for video streaming services. Or, use of a voicemail service application 130 may require the network service plan 115 to allow for voicemail messaging services.

The SPG 135 may be a device or application which allows users of networked computing devices 105 to enable and disable services by way of the networked computing device 105. The SPG 135 accordingly provides provisioning services to the networked computing devices 105. Additionally, the SPG 135 may provide validation services, such as verifying that the networked computing device 105 is associated with an identifier (e.g., MDN, URI, etc.) authorized to access the SPG 135. Moreover, the SPG 135 may receive, from networked computing devices 105, requests for self-provisioning (SP) content 140 for use in provisioning of services to the networked computing devices 105. The SP content 140 may include pricing and offer information, terms and conditions, and the other text used during the provisioning process. Additionally, the SPG 135 may receive requests for changes in the configuration of the network service plan 115 from the networked computing devices 105, and may implement those requests, including forwarding them to the billing system 120 and/or activation system 125.

In general, computing systems and/or devices, such as networked computing device 105, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices such as networked computing devices 105 generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. The service application 130 may be one such computer program product. In some example, the service application 130 may be provided as software that when executed by the processor provides the operations described herein. Alternatively, the service application 130 may be provided as hardware or firmware, or combinations of software, hardware and/or firmware.

Figure 2:
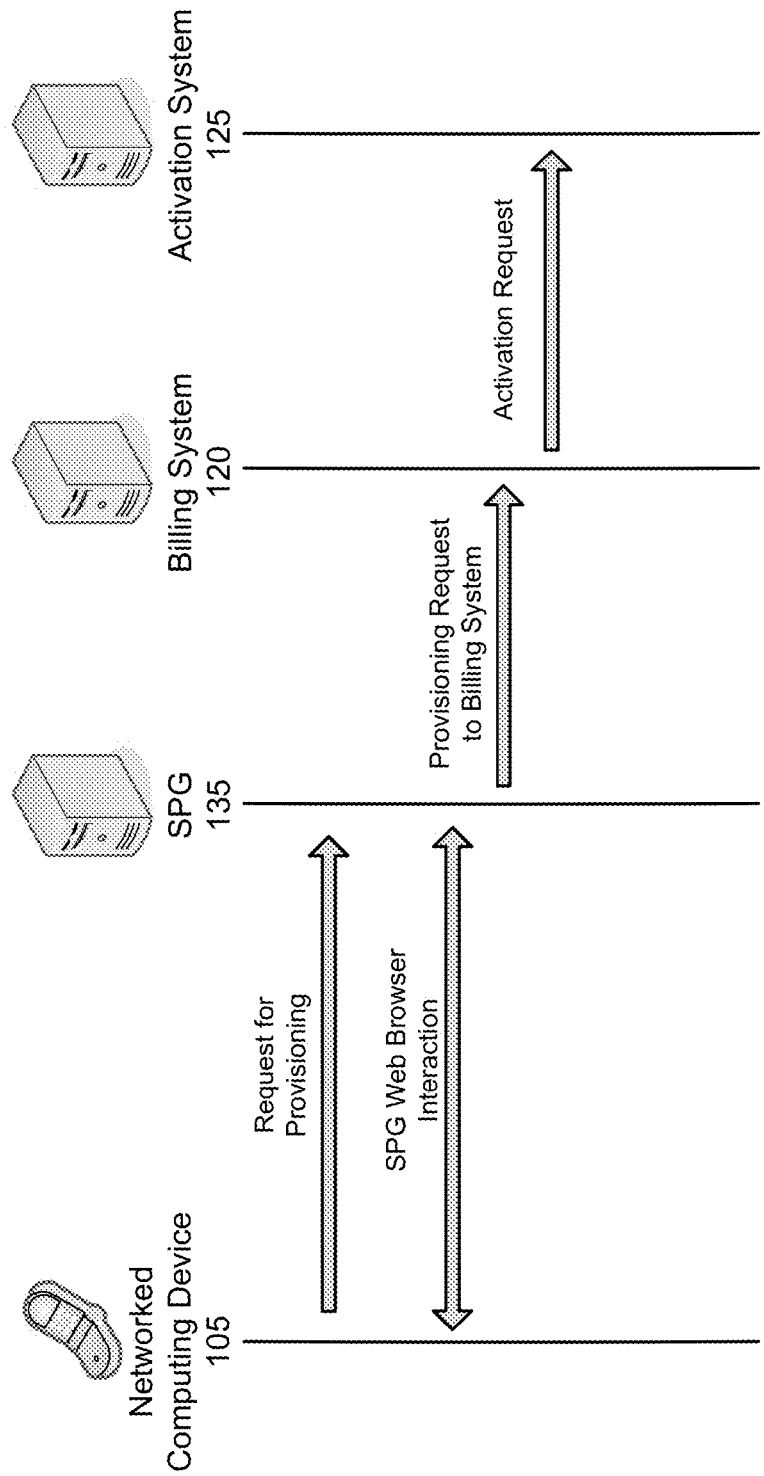
FIG. 2 illustrates an exemplary flow for a client model of a networked computing device in communication with a self-provisioning gateway.

FIG. 2 illustrates an exemplary flow for a client model 200 of a networked computing device 105 in communication with a SPG 135. In the client model 200, a user may select to utilize a service application 130 on the networked computing device 105. When the user launches the service application 130, the service application 130 may determine whether use of the service application 130 requires a change in the configuration of a network service plan 115 associated with the networked computing device 105. If the user is already subscribed to the service, then no change in the configuration of a network service plan 115 is required. In this case, the service application 130 will run and provide the service.

If the user is not yet subscribed to the service, the service application 130 may send a request to provision the required service, and may launch a browser application to interact with the SPG 135. The SPG 135 may provide a sign-up page, additional information pages, and terms and conditions pages to guide the user through the subscription process for the service. When the user chooses to submit a provisioning request to update his or her network service plan 115, the SPG 135 may perform appropriate checks on the request and call a backend application programming interface (API) to submit the order to subscribe the user to the service. For example, the SPG 135 may send an activation request to the activation system 125 to facilitate configuration of the underlying network architecture.

The client model 200 offers certain advantages. For example, because the SPG 135 controls all the pricing and offer information and textual information, it is easy for a system operator to make an update to the terms, descriptions, or costs of the service. Moreover, these updates may be made without updates to the service application 130 on the networked computing device 105. The client model 200 however, may be considered by some to suffer certain disadvantages. For example, because the service application 130 launches the browser application and connects to the SPG 135, the user may experience a different display style when moving from the service application to the browser. As another potential disadvantage, once the provisioning process is complete, the user may be forced to close the service application 130 and then reopen the service application 130. As yet another arguable disadvantage according to at least some, the client model 200 may be relatively slow to navigate from page to page, as the page data may be served over the communications network 110 from the SPG 135.

Figure 3:
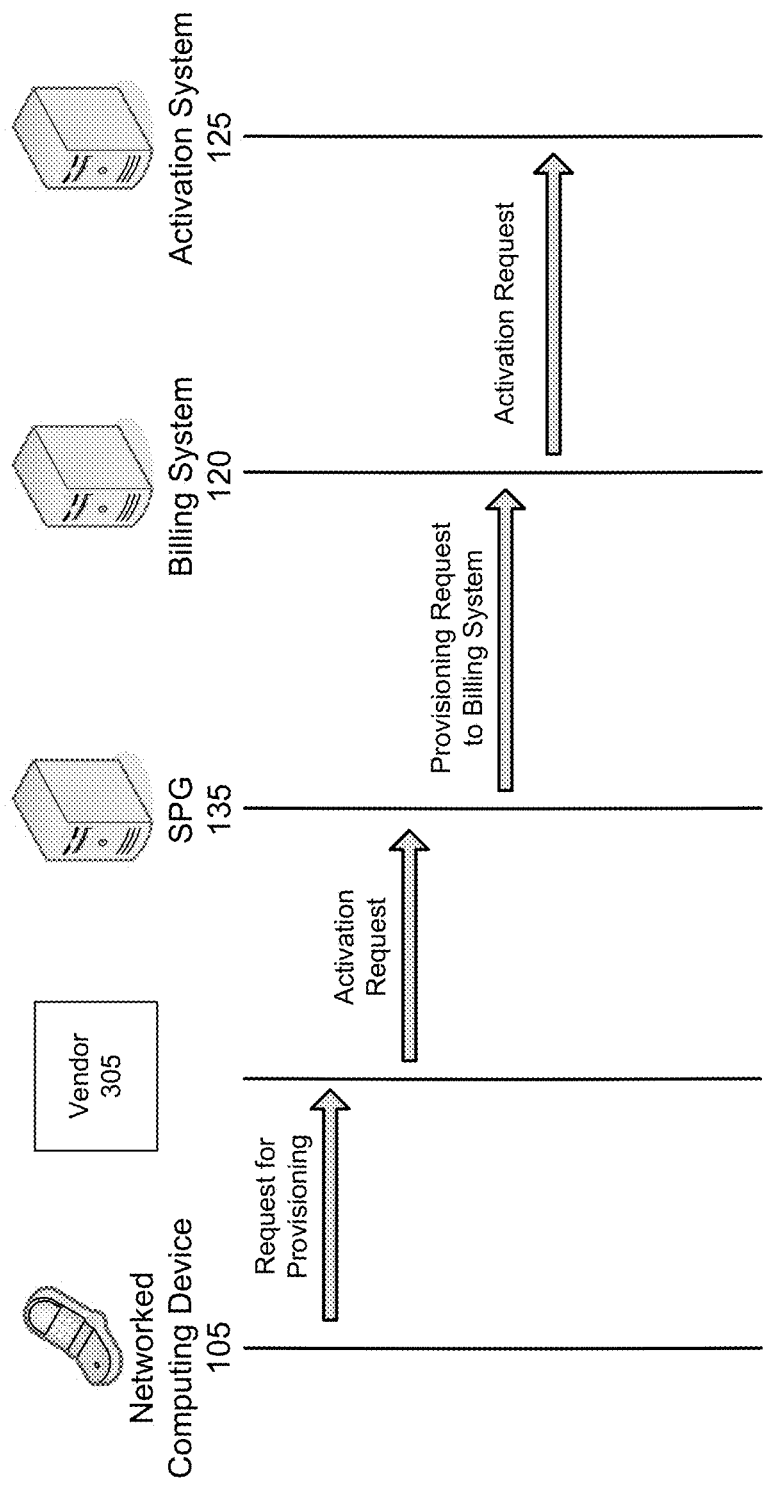
FIG. 3 illustrates an exemplary flow for a vendor model of a networked computing device in communication with a self-provisioning gateway.

FIG. 3 illustrates an exemplary flow for a vendor model 300 of a networked computing device 105 in communication with a SPG 135. In the vendor model 300, a user may select to utilize a service application 130 on the networked computing device 105. When the user launches the service application 130, the service application 130 may determine whether use of the service application 130 requires a change in the configuration of a network service plan 115 associated with the networked computing device 105.

If the user does not have the subscription, the service application 130 itself may guide the user to subscribe to the service. When the user submits a request to sign up for the service, the service application 130 may send a provisioning request to a third party vendor 305. The third party vendor 305 in turn may send a request to the SPG 135 to update the user's network service plan 115. The SPG 135 then may perform appropriate checks on the request, and may call the backend API to submit the order to subscribe the user to the service. For example, the SPG 135 may send an activation request to the activation system 125 to facilitate configuration of the underlying network architecture.

The vendor model 300 offers certain advantages, such as that the user has a unified application experience uninterrupted by transfer to a web application. However, a potential disadvantage of the vendor model 300 is that it is difficult for a system operator to update pricing and offer information, terms and conditions, and the other text used during the provisioning process. For example, if the relevant pricing and plan information is stored within the service application 130 itself, a new version of the service application 130 may be required to provide updated information. Another arguable disadvantage of the vendor model 300 is that a third party vendor 305 may be required to invoke the provisioning process.

Figure 4:
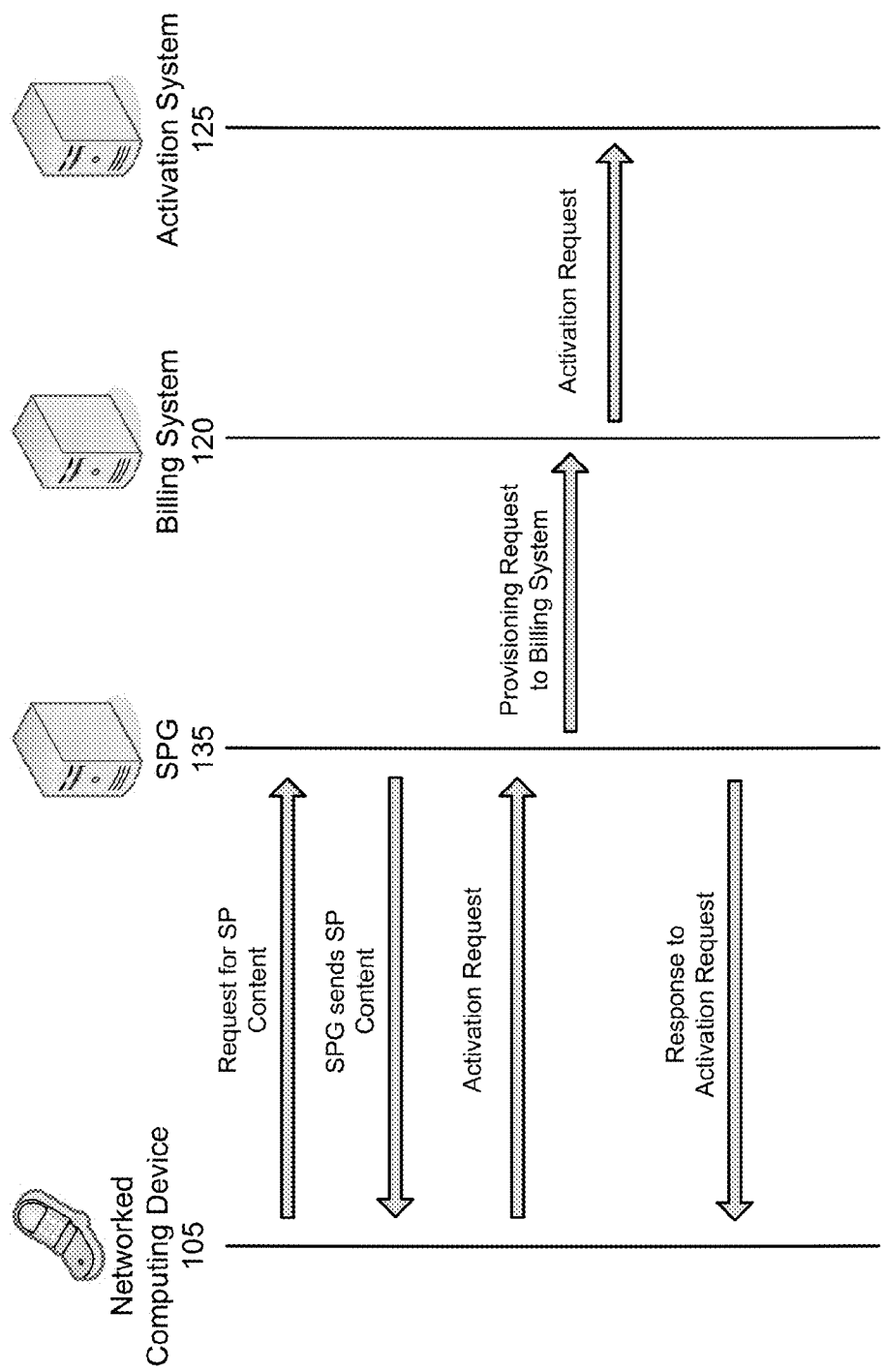
FIG. 4 illustrates an exemplary flow for a hybrid model of a networked computing device in communication with a self-provisioning gateway.

FIG. 4 illustrates an exemplary flow for a hybrid model 400 of a networked computing device 105 in communication with a SPG 135. The hybrid model 400 utilizes a two-step flow, first requesting SP content 140 that may be used for providing provisioning information in a user interface, and then requesting the actual provisioning of the service responsive to the user interface and based on the received SP content 140. Thus, the hybrid model 400 includes aspects from the client model 200 and the vendor model 300, to provide advantages from both the client model 200 and the vendor model 300, while addressing the potential disadvantages of both.

Similar to the client model 200 and the vendor model 300, in the hybrid model 400, a user may select to utilize a service application 130 on the networked computing device 105. When the user launches the service application 130, the service application 130 may determine whether use of the service application 130 requires a change in the configuration of a network service plan 115 associated with the networked computing device 105.

If the user does not have a subscription to the service, the service application 130 may send a request to the SPG 135 for SP content 140 to utilize in provisioning the service to the user. Notably, the request for SP content 140 is not a request for provisioning of the service itself. Rather, the request for SP content 140 is a request for information used to present provisioning information to the user, thereby allowing the user to select an appropriate plan, obtain more information regarding the service, and view and accept the terms and conditions for the service. The SP content 140 may further include pricing and offer information as well as information regarding current promotional offers. In some examples, the content request may be implemented by way of a secure messaging protocol to the SPG 135, such by way of hypertext transfer protocol secure (HTTPS).

The SPG 135 accordingly provides the requested SP content 140 to the networked computing device 105 in a suitable format. In some examples, the response SP content 140 may be encoded in a form of extensible markup language (XML). The service application 130 may then organize the received data and display it via the networked computing device 105. This portion of the hybrid model 400 involving the request to and retrieval of SP content 140 from the SPG 135 may be referred to as the content fetch portion, and is discussed in further detail with respect to FIG. 5.

Once the user has proceeded through the provisioning pages and submitted an activation request to sign up for the service, the service application 130 may create a request to provision the service for the networked computing device 105. In order to have the data necessary to create the request, the service application 130 may utilize the SP content 140 received from the content fetch portion of the hybrid model 400, along with the selections from the user. The service application 130 then may send the provisioning request to the SPG 135. Once the request is submitted to the SPG 135, the SPG 135 may facilitate the provisioning of the service for the user. The SPG 135 may further perform checks on the request such as verifying user access, and may call a backend API to submit the order to subscribe the user to the service. For example, the SPG 135 may forward the validated request to the billing system 120 and/or activation system 125. The SPG 135 may further return a response to the activation request to the service application 130 indicating whether the activation request was successful. This second portion of the hybrid model 400 call flow relating to provisioning the service may be referred to as a change data feature request, and is discussed in further detail with respect to FIG. 6.

By using the hybrid model 400 a user is able to complete the provisioning flow directly from the service application 130 without having to use a separate web browser application. Additionally, the hybrid model 400 provides the advantage that once the user has completed both portions of the hybrid model 400, the user can immediately access the service application 130 without having to reopen it.

Further, because the SPG 135 provides the SP content 140 in the hybrid model 400, the service application 130 may provide the SP content 140 in a form that is visually consistent with the rest of the service application 130. For example, navigation service applications 130 from different vendors could utilize the same SP content 140 from the SPG 135, but may present the SP content 140 in different user interface styles (each of which is perhaps unique to the vendor or navigation service application 130). While different service applications 130 from different vendors may use the same SP content 140, the provisioning requests sent from the different service applications 130 may identify which vendor's service application 130 is sending the provisioning request. For instance, the provisioning request may include a parameter in the request to identify the associated vendor of the service application 130. The parameter may be any numerical or other type of code suitable for identifying the vendor. In some examples, the parameter may be a value assigned to the vendor by the SPG 135, billing system 120, and/or activation system 125. In other examples, the parameter may be assigned to the vendor according to a pricing agreement between the vendor and the service provider. This parameter may be referred to as a channel identifier.

Yet further, because the SPG 135 controls all the provisioning flows, pricing and offer information and textual information, it is easy for a system operator to make an update to the terms, descriptions, or costs of the service. Moreover, these updates may be made without updates to the service application 130 or to the networked computing device 105.

Figure 5:
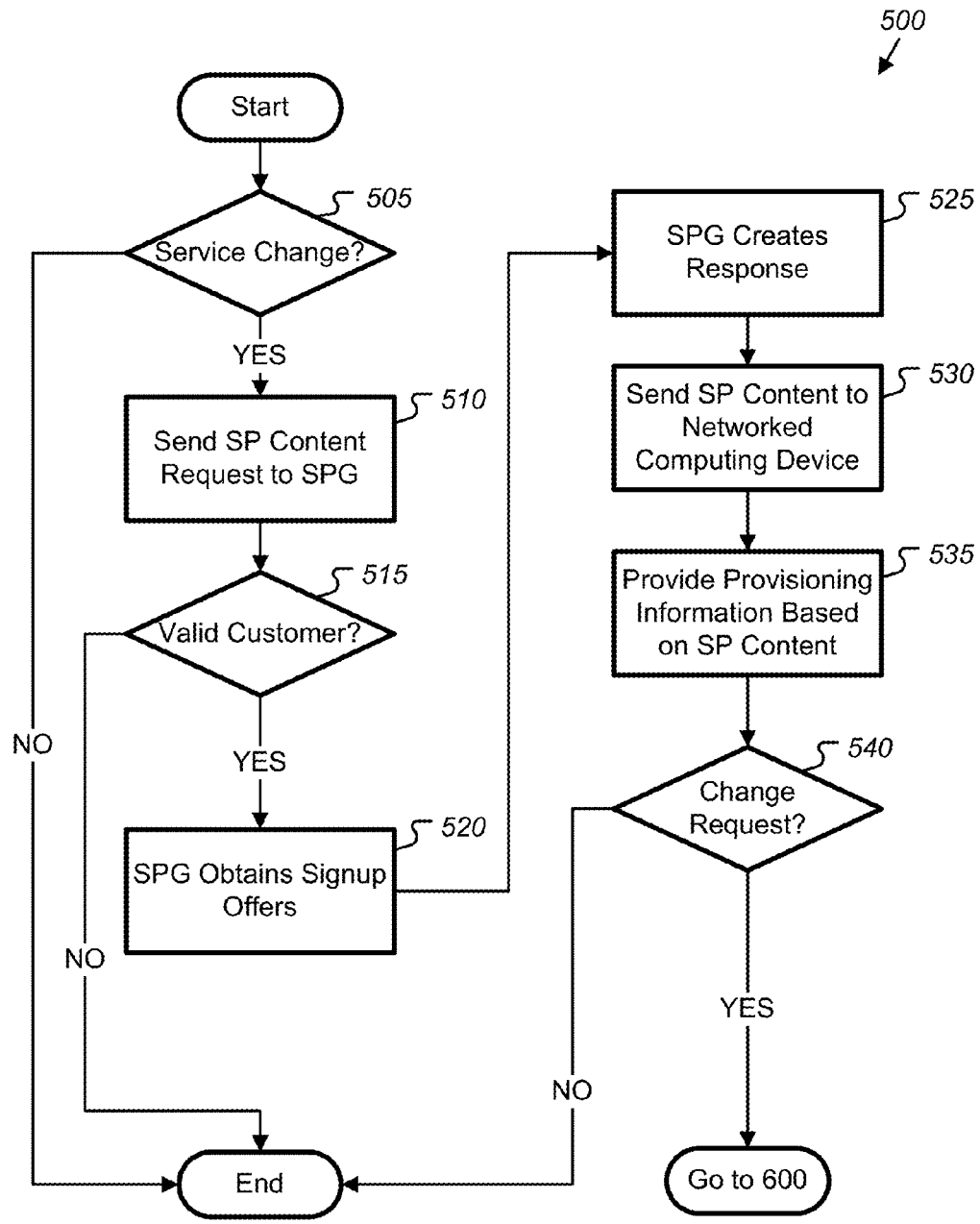
FIG. 5 illustrates an exemplary content fetch portion of a process flow for a hybrid model.

FIG. 5 illustrates an exemplary process 500 for a content fetch portion of a process flow for a hybrid model 400. The process 500 may be performed by various devices, such as by a networked computing device 105 executing instructions of a service application 130 using a processor.

In block 505, the service application 130 determines whether use of the service application 130 requires a change in the configuration of a network service plan 115 associated with the networked computing device 105. For example, the service application 130 may attempt to access a service over the communications network 110, and may receive a reply from the service indicating that the networked computing device 105 is not authorized.

In block 510, the service application 130 sends a SP content 140 request to the SPG 135. The SP content 140 request may include a request for pricing and offer information and textual information necessary to provide prompts to the user of the networked computing device 105. The requested SP content 140 may accordingly be sufficient to allow for the user to submit a request to facilitate the provisioning of the service. In some examples, the SP content 140 request may be sent to the SPG 135 over a secure protocol, such as HTTPS.

In block 515, the SPG 135 validates the networked computing device 105. For example the SPG 135 may verify that the networked computing device 105 is associated with a MDN or URI authorized to access the SPG 135. If the networked computing device 105 is not authorized, then the process 500 ends. Otherwise, the process continues to block 520.

In block 520, the SPG 135 obtains sign-up offers appropriate for the networked computing device 105. For example, the SPG 135 may determine or otherwise obtain offers based on the current plan information of the networked computing device 105, according to the geographic location of the networked computing device 105, based on the type or model of the networked computing device 105, based on the vendor of the service application 130, and/or based on a user rating associated with the networked computing device 105. As an example, based on the current plan information of the networked computing device 105, the SPG 135 may provide an offer for a discount on multiple unsubscribed services if they are purchased together in a bundle. As another example, the SPG 135 may adjust the pricing of an offer for a service based on the present location or the home location of the networked computing device 105. As yet another example, the SPG 135 may offer different pricing for the same service based on the vendor of the service application 130, potentially based on a pricing agreement between the vendor and the service provider. As yet a further example, the SPG 135 may offer discounted pricing for networked computing devices 105 associated with users who are highly rated on a social networking web site or users who consistently provide good quality product reviews.

In block 525, the SPG 135 creates a response including the SP content 140 to be returned to the networked computing device 105. For example, the SP content 140 may include pricing and offer information (including the determined offer information discussed above), terms and conditions, and the other text, images, or other information used during the provisioning process. The SPG 135 may use an XML module to encode the SP content 140 in an XML format.

In block 530, the SPG 135 sends the response including the SP content 140 to the networked computing device 105. The SPG 135 may send the SP content 140 to the networked computing device 105 as XML. In some cases, the SP content 140 may be returned over a secure protocol, such as HTTPS. The SP content 140 may be delivered via a push or pull technique.

In block 535, the service application 130 provides provisioning information to the user of the networked computing device 105 according to the received SP content 140. For example, the service application 130 may provide a provisioning user interface directly from the service application 130 without having to resort to web pages external to the service application 130. In some embodiments, the information may be provided passively while in other embodiments, the service application 130 may prompt to the user to take action.

In block 540, the service application 130 receives a submit action from the user indicating that the user desires to make a change to the plan. If the user desires to make the change to the plan, a provisioning portion 600 of a process flow for a hybrid model 400 may be executed next. Otherwise, the process 500 ends. The determination may thus be made via user action (e.g., entering information, accepting conditions) or inaction (e.g., by not selecting to accept the plan changes within a predetermined amount of time set by, for example, the service application 130 or SPG 135).

Figure 6:
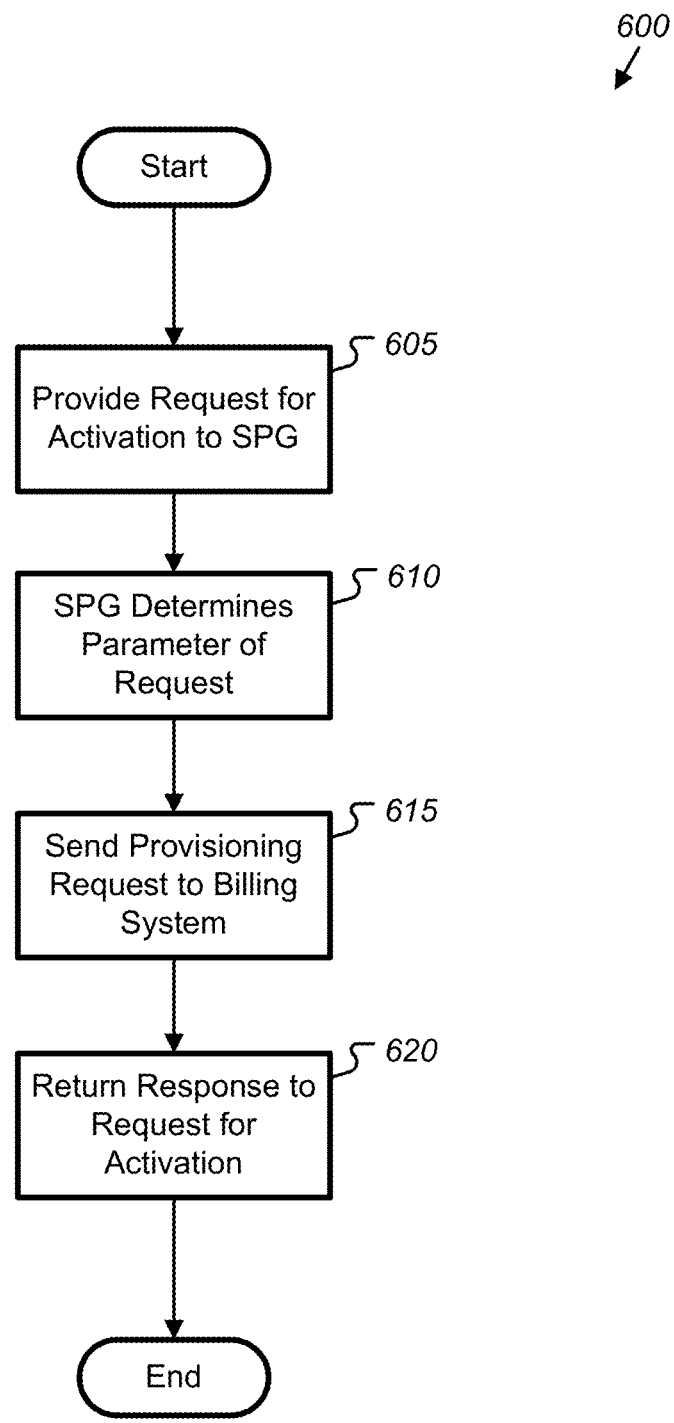
FIG. 6 illustrates an exemplary provisioning portion of a process flow for a hybrid model.

FIG. 6 illustrates an exemplary process 600 for a provisioning portion of a process flow for a hybrid model 400. As with the process 500, the process 600 may also be performed by devices such as by a networked computing device 105 executing instructions of a service application 130.

In block 605, the service application 130 provides a request for activation to the SPG 135. For example, the service application 130 may send an XML request to the SPG 135 including a plan change agreed to by the user of the networked computing device 105.

In block 610, the SPG 135 optionally determines a parameter of the request using a channel identifier included in the request. In some cases, a channel identifier may be included in the provisioning request identifying the vendor of the service application 130. This channel identifier may be understood by the SPG 135, and may be used in part to determine costs or other aspects of the change to the network service plan 115. For instance, use of navigation service may incur one cost if used from a service application 130 from one vendor, but may incur a different cost if used from a service application 130 from another vendor. Accordingly, the request for use of navigation services may include a channel identifier identifying the vendor of the service application 130. As another example, a request for additional network storage capacity may include a channel identifier identifying the amount of additional storage being requested or an additional amount of bandwidth being requested. For instance, the channel identifier may be set to a first value to indicate an amount of additional storage or bandwidth, and may be set to a second value to indicate a greater or lesser amount of additional storage or bandwidth.

In block 615, the SPG 135 calls a backend API to submit the order for the user. For example, the SPG 135 send a request to the billing system 120 (which in turn may forward a message to the activation system 125) to implement network changes necessary to implement the plan change for the networked computing device 105. In some cases, the SPG 135 may use a backend API similar to that used by the vendor 305 in the vendor model 300.

In block 620, the SPG 135 returns a response to the request for activation to the service application 130. The response may include an indication of whether the order was successfully processed by the SPG 135, billing system 120, and/or activation system 125. In other cases, rather than the SPG 135 returning a response, the service application 130 may determine whether the activation request was successful by attempting to access the requested service over the communications network 110, and determining based on a reply received from the service whether the service application 130 is now authorized to use the service. After block 620, the process 600, and the hybrid model 400, ends.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
a networked computing device in selective communication with a communications network and configured to:
   determine, by a service application executing on the networked computing device, to change a configuration of a network service plan associated with the networked computing device and used by the service application, the network service plan identifying whether at least one service of the communications network is available for use by the networked computing device,
   request self-provisioning content from a self-provisioning gateway responsive to the determination,
   provide, by the service application, a user interface for configuration of the network service plan based on the received self-provisioning content,
   send a change data feature request including a channel identifier indicating a parameter of the change data feature request to the self-provisioning gateway responsive to a request for the change in the configuration of the network service plan received through the provided user interface, and
   allow for utilization of the service application after receiving a response to the change data feature request without having to restart the service application,
   wherein the service application is further configured to send an identifier of the networked computing device to the self-provisioning gateway to validate usage of the self-provisioning gateway by the networked computing device, responsive to the determination to change the configuration of the network service plan.

2. The system of claim 1, wherein the service application is further configured to determine that use of the service application requires the change in the configuration of the network service plan.

3. The system of claim 1, wherein the networked computing device is further configured to determine to change the configuration of the network service plan responsive to receiving an indication from a user to invoke the service application.

4. The system of claim 1, wherein the service application includes at least one of a streaming media application, a voicemail application or a navigation application.

5. The system of claim 1, wherein the channel identifier indicates at least one of a vendor of the service application, an amount of bandwidth being requested and an amount of storage being requested.

6. The system of claim 1, wherein the self-provisioning content includes an offer based on at least one of the network service plan of the networked computing device, a geographic location of the networked computing device, a type of the networked computing device, a model of the networked computing device, a vendor of the service application, or a user rating associated with the networked computing device.

7. A method, comprising:
determining, by a service application executing on a networked computing device in selective communication with a communications network, to change a configuration of a network service plan associated with the networked computing device and used by the service application, the network service plan identifying whether at least one service of the communications network is available for use by the networked computing device;
requesting self-provisioning content from a self-provisioning gateway responsive to the determination;

providing, by the service application, a user interface for configuration of the network service plan based on the received self-provisioning content;

sending a change data feature request including a channel identifier indicating a parameter of the change data feature request to the self-provisioning gateway responsive to a request for the change in the configuration of the network service plan received through the provided user interface;

allowing for utilization of the service application after receiving a response to the change data feature request without having to restart the service application; and sending, responsive to the determination to change the configuration of the network service plan, an identifier of the networked computing device to the self-provisioning gateway to validate usage of the self-provisioning gateway by the networked computing device.

8. The method of claim 7, further comprising determining, by the service application, that use of the service application requires the change in the configuration of the network service plan.

9. The method of claim 7, further comprising determining to change the configuration of the network service plan responsive to receiving an indication from a user to invoke the service application.

10. The method of claim 9, wherein the service application includes at least one of a streaming media application, a voicemail application or a navigation application.

11. The method of claim 7, the channel identifier indicating at least one of a vendor of the service application, an amount of bandwidth being requested and an amount of storage being requested.

12. The method of claim 7, the self-provisioning content including an offer based on at least one of the network service plan of the networked computing device, a geographic location of the networked computing device, a type of the networked computing device, a model of the networked computing device, a vendor of the service application, or a user rating associated with the networked computing device.

13. A non-transitory computer readable medium storing a service application software program, the service application being executable to provide operations comprising:

determining to change a configuration of a network service plan associated with a networked computing device in selective communication with a communications network and used by the service application, the network service plan identifying whether at least one service of the communications network is available for use by the networked computing device;

requesting self-provisioning content from a self-provisioning gateway responsive to the determination;

providing a user interface for configuration of the network service plan based on the received self-provisioning content;

sending a change data feature request including a channel identifier indicating a parameter of the change data feature request to the self-provisioning gateway responsive to a request for the change in the configuration of the network service plan received through the provided user interface;

allowing for utilization of the service application after receiving a response to the change data feature request without having to restart the service application; and sending, responsive to the determination to change the configuration of the network service plan, an identifier of the networked computing device to the self-provisioning gateway to validate usage of the self-provisioning gateway by the networked computing device.

14. The non-transitory computer readable medium of claim 13, the service application being further executable to provide operations comprising determining that use of the service application requires the change in the configuration of the network service plan.

15. The non-transitory computer readable medium of claim 13, the service application being further executable to provide operations comprising determining to change the configuration of the network service plan responsive to receiving an indication from a user to invoke the service application.

16. The non-transitory computer readable medium of claim 15, wherein the service application includes at least one of a streaming media application, a voicemail application or a navigation application.

17. The non-transitory computer readable medium of claim 13, the channel identifier indicating at least one of a vendor of the service application, an amount of bandwidth being requested and an amount of storage being requested.

18. The non-transitory computer readable medium of claim 13, the self-provisioning content including an offer based on at least one of the network service plan of the networked computing device, a geographic location of the networked computing device, a type of the networked computing device, a model of the networked computing device, a vendor of the service application, or a user rating associated with the networked computing device.

* * * * *